(12) United States Patent
Li

(10) Patent No.: US 9,098,895 B2
(45) Date of Patent: Aug. 4, 2015

(54) IMAGE PROCESSING METHOD AND DEVICE

(71) Applicant: Huawei Technologies Co., LTD, Shenzhen (CN)

(72) Inventor: Shuiping Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 183 days.

(21) Appl. No.: 13/928,028

(22) Filed: Jun. 26, 2013

(65) Prior Publication Data

US 2014/0010440 A1 Jan. 9, 2014

(30) Foreign Application Priority Data

Jun. 30, 2012 (CN) .......................... 2012 1 0222868

(51) Int. Cl.
*G06T 5/00* (2006.01)
*G06T 5/20* (2006.01)

(52) U.S. Cl.
CPC ................ *G06T 5/001* (2013.01); *G06T 5/003* (2013.01); *G06T 5/20* (2013.01); *G06T 2207/10024* (2013.01); *G06T 2207/20012* (2013.01); *G06T 2207/20192* (2013.01)

(58) Field of Classification Search
None
See application file for complete search history.

(56) References Cited

U.S. PATENT DOCUMENTS

| 8,290,294 B2 * | 10/2012 | Kopf et al. | 382/274 |
| 8,774,555 B2 * | 7/2014 | Xianghui | 382/274 |
| 8,958,637 B2 * | 2/2015 | Fukunaga | 382/167 |
| 2014/0010440 A1 * | 1/2014 | Li | 382/163 |

OTHER PUBLICATIONS

He, K., et al., "Single Image Haze Removal Using Dark Channel Prior," IEEE Conference on Computer Visio and Pattern Recognition, CVPR 2009, pp. 1-8.*

* cited by examiner

*Primary Examiner* — Sean Motsinger
(74) *Attorney, Agent, or Firm* — Slater & Matsil, L.L.P.

(57) ABSTRACT

Embodiments of the present invention provide an image processing method and device. In the embodiments of the present invention, conversion processing is performed on an input image, which effectively eliminates an impact on image quality from such weather conditions as fog, dust-haze, sand storm and rain where atmospheric transparency is low, and can solve a problem in the prior art that image quality of a captured image or video is poor due to a scattering function of suspended particles in the atmosphere under such weather conditions as fog, dust-haze, sand storm and rain where atmospheric transparency is low, thereby improving contrast, saturation, and sharpness of an image or a video (namely, a multi-frame image). The technical solutions according to the present invention are easy to be implemented and have a low cost.

20 Claims, 1 Drawing Sheet

ID PROCESSING METHOD AND DEVICE

IMAGE PROCESSING METHOD AND DEVICE

CROSS-REFERENCE TO RELATED APPLICATION

This application claims priority to Chinese Patent Application No. 201210222868.7, filed on Jun. 30, 2012, which is hereby incorporated by reference in its entirety.

TECHNICAL FIELD

The present invention relates to image processing technologies, and in particular, to an image processing method and device.

BACKGROUND

With the development of information technology, more and more terminals are equipped with photo shooting and video shooting functions, for example, a camcorder, a portable camera, a mobile terminal having a photo/video shooting function, a telephone terminal having a visual communication function, and a video-conferencing terminal. All these terminals include a processor used for processing data of an image and a video (namely, a multi-frame image) captured by an image or video capturing apparatus.

However, under such weather conditions as fog, dust-haze, sand storm and rain where atmospheric transparency is low, image quality of the captured image or video is poor due to a scattering function of suspended particles in the atmosphere, leading to low contrast, saturation and sharpness of the image or video.

SUMMARY

The present invention provides an image processing method and device, so as to improve contrast, saturation and sharpness of an image or a video.

In one aspect, an image processing method is provided and includes:

inputting a first image, where the first image is an RGB format image or a gray format image;

converting, according to a preset image resolution, the first image or a gray format image converted from the first image into a second image corresponding to the preset image resolution, where the second image is a gray format image;

obtaining an atmospheric optical parameter according to the second image;

converting, according to an image resolution of the first image, the second image into a third image corresponding to the image resolution of the first image;

obtaining an atmospheric transfer function according to the atmospheric optical parameter, the first image, and the third image, or according to the atmospheric optical parameter, the gray format image converted from the first image, and the third image; and obtaining a fourth image according to the atmospheric optical parameter, the first image, and the atmospheric transfer function.

In another aspect, an image processing device is provided and includes:

a collector, configured to input a first image, where the first image is an RGB format image or a gray format image; and a processor, configured to: convert, according to a preset image resolution, the first image or a gray format image converted from the first image into a second image corresponding to the preset image resolution, where the second image is a gray format image; obtain an atmospheric optical parameter according to the second image; convert, according to an image resolution of the first image, the second image into a third image corresponding to the image resolution of the first image; obtain an atmospheric transfer function according to the atmospheric optical parameter, the first image, and the third image, or according to the atmospheric optical parameter, the gray format image converted from the first image, and the third image; and obtain a fourth image according to the atmospheric optical parameter, the first image, and the atmospheric transfer function.

It can be known from the foregoing technical solutions that, in the embodiments of the present invention, conversion processing is performed on an input image, which effectively eliminates an impact on image quality from such weather conditions as fog, dust-haze, sand storm and rain where atmospheric transparency is low, and can solve a problem in the prior art that image quality of a captured image or video is poor due to a scattering function of suspended particles in the atmosphere under such weather conditions as fog, dust-haze, sand storm and rain where atmospheric transparency is low, thereby improving contrast, saturation, and sharpness of an image or a video (namely, a multi-frame image). The technical solutions according to the present invention are easy to be implemented and have a low cost.

BRIEF DESCRIPTION OF DRAWINGS

To describe the technical solutions in the embodiments of the present invention more clearly, the following briefly introduces accompanying drawings required for describing the embodiments. Apparently, the accompanying drawings in the following description show merely some embodiments of the present invention, and persons of ordinary skill in the art may further obtain other drawings according to these accompanying drawings without creative efforts.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

The term "and/or" in this document is only an association relationship for describing associated objects, and represents that three relationships may exist, for example, A and/or B may represent the following three cases: A exists alone, both A and B exist, and B exists alone. In addition, the character "/" in this document usually represents that the former and later associated objects are in a "or" relationship.

Figure 1:
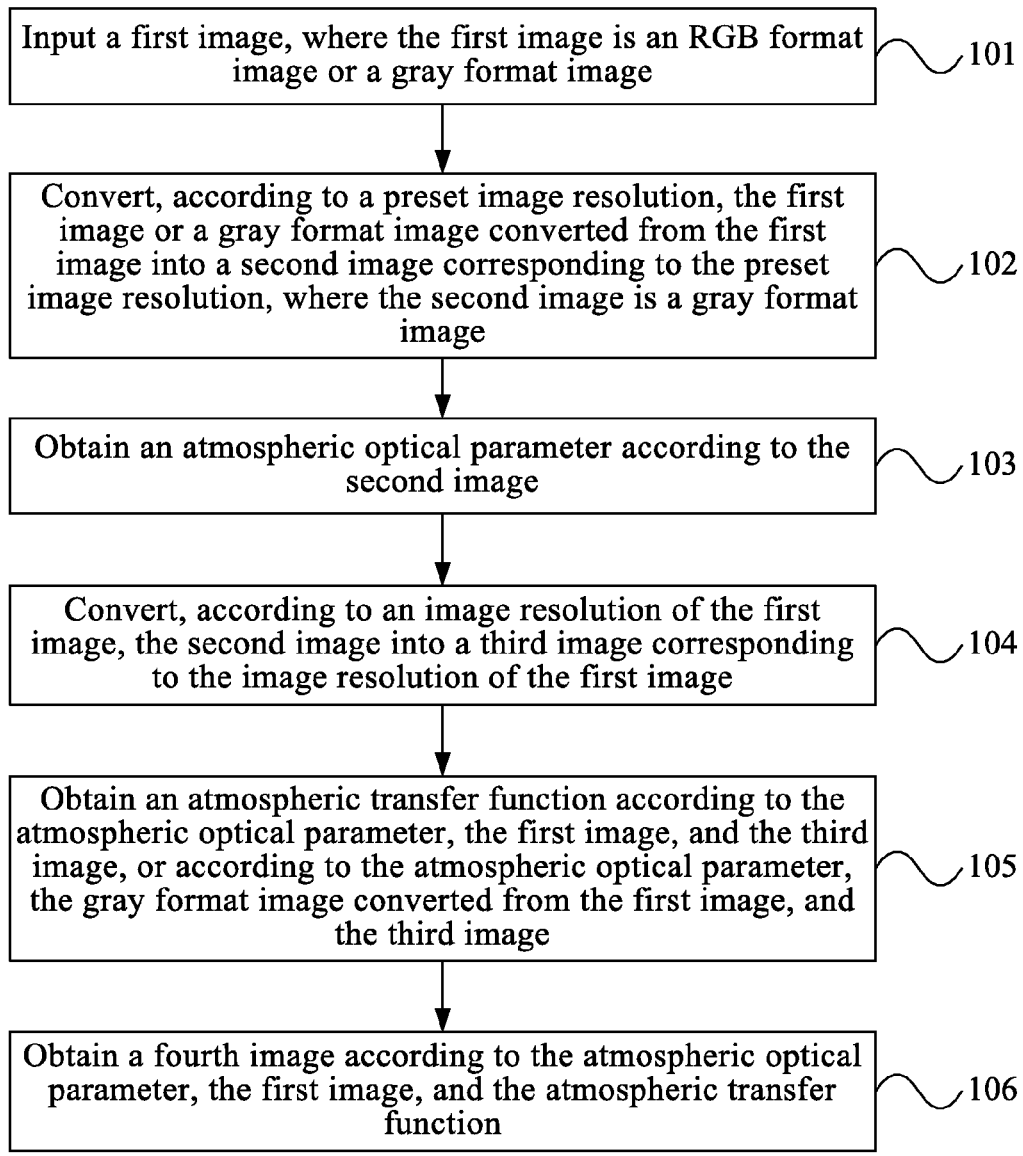
FIG. 1 is a schematic flow chart of an image processing method according to one embodiment of the present invention.

As shown in FIG. 1, FIG. 1 is a schematic flow chart of an image processing method according to one embodiment of the present invention.

101: Input a first image, where the first image is an RGB format image or a gray format image.

102: Convert, according to a preset image resolution, the first image or a gray format image converted from the first image into a second image corresponding to the preset image resolution, where the second image is a gray format image.

103: Obtain an atmospheric optical parameter according to the second image.

104: Convert, according to an image resolution of the first image, the second image into a third image corresponding to the image resolution of the first image.

105: Obtain an atmospheric transfer function according to the atmospheric optical parameter, the first image, and the third image, or according to the atmospheric optical parameter, the gray format image converted from the first image, and the third image.

106: Obtain a fourth image according to the atmospheric optical parameter, the first image, and the atmospheric transfer function.

Optionally, in an optional implementation manner of this embodiment, the first image is an RGB format image. Before 102, the first image may be further converted into a gray format image according to $$I_{gray} = \min_{c \in (R,G,B)} (I^c),$$

where $I^c$ is a pixel component value of the first image, R is a red component of a pixel of the first image, G is a green component of a pixel of the first image, B is a blue component of a pixel of the first image, and $I_{gray}$ is a pixel value of the gray format image converted from the first image.

Optionally, in an optional implementation manner of this embodiment, in 102, specifically, the first image or the gray format image converted from the first image is divided into M×N pixel blocks according to a preset image resolution M×N; a minimum pixel value is then selected from pixel values of pixels in the pixel blocks; finally, the selected minimum pixel value is used as a pixel value of a pixel of the second image.

Optionally, in an optional implementation manner of this embodiment, the first image is an RGB format image. Correspondingly, in 103, specifically, a maximum pixel value is selected from pixel values of pixels of the second image; a pixel block corresponding to the selected maximum pixel value is then determined; a maximum sum of pixel component values is selected from sums of pixel component values of pixels in the determined pixel block; a pixel corresponding to the selected maximum sum of pixel component values is determined; and a pixel component value of the determined pixel is used as the atmospheric optical parameter.

Optionally, in an optional implementation manner of this embodiment, the first image is a gray format image. Correspondingly, in 103, specifically, a maximum pixel value is selected from pixel values of pixels of the second image; and the selected maximum pixel value is then used as the atmospheric optical parameter.

Optionally, in an optional implementation manner of this embodiment, in 104, specifically, smooth filtering is performed on the second image. For example, the smooth filtering may be specifically performed by adopting an average filter (Average Filter), a Gaussian filter (Gaussian Filter), or other filters that achieve a similar effect. The second image that has undergone the smooth filtering is then converted, according to the image resolution of the first image, into a third image corresponding to the image resolution of the first image by adopting, for example, bilinear resampling (Bilinear Resampling), bicubic resampling (Bicubic Resampling), or other image amplification methods used in the field.

Optionally, in an optional implementation manner of this embodiment, the first image is a gray format image. Correspondingly, in 105, specifically, smooth filtering is performed on the first image, for example, smooth filtering with edge protection is performed. Specifically, a median filter (Median Filter), a bilateral filter (Bilateral Filter), or other filters that can achieve a similar effect may be adopted. The atmospheric transfer function is then obtained according to the atmospheric optical parameter, the first image that has undergone the smooth filtering, and the third image.

For example, the atmospheric transfer function is obtained according to $$t(x) = 1 - \frac{I(x)}{A} \times \frac{I'}{255},$$

where I(x) is a pixel value of the third image, I' is a pixel value of the first image or a pixel value of the first image that has undergone the smooth filtering, A is the atmospheric optical parameter, and t(x) is the atmospheric transfer function.

Optionally, in an optional implementation manner of this embodiment, the first image is an RGB format image. Correspondingly, in 105, specifically, smooth filtering is performed on the gray format image converted from the first image, for example, smooth filtering with edge protection is performed. Specifically, a median filter, a bilateral filter, or other filters that can achieve a similar effect may be adopted. The atmospheric transfer function is then obtained according to the atmospheric optical parameter, the gray format image that is converted from the first image and has undergone the smooth filtering, and the third image.

For example, the atmospheric transfer function is obtained according to $$t(x) = 1 - \frac{I(x)}{A} \times \frac{I'}{255},$$

where I(x) is a pixel value of the third image, I' is a pixel value of the gray format image converted from the first image or a pixel value of the gray format image that is converted from the first image and has undergone the smooth filtering, A is the atmospheric optical parameter, and t(x) is the atmospheric transfer function.

Optionally, in an optional implementation manner of this embodiment, in 101, specifically, a fourth image is input, where the fourth image is an image in a format other than the RGB format and the gray format. An RGB format image converted from the fourth image is then used as the first image.

In this embodiment, conversion processing is performed on an input image, which effectively eliminates an impact on image quality from such weather conditions as fog, dust-haze, sand storm and rain where atmospheric transparency is low, and can solve a problem in the prior art that image quality of a captured image or video is poor due to a scattering function of suspended particles in the atmosphere under such weather conditions as fog, dust-haze, sand storm and rain where atmospheric transparency is low, thereby improving contrast, saturation, and sharpness of an image or a video (namely, a multi-frame image). The technical solutions according to the present invention are easy to be implemented and have a low cost.

It should be noted that, for brevity, the foregoing method embodiments are represented as a series of action combinations. However, persons skilled in the art should understand that the present invention is not limited to the order of the described actions, because according to the present invention, some steps may adopt other order or may be performed simultaneously. Persons skilled in the art should be further aware that the described embodiments in the specification all belong to exemplary embodiments, and the involved actions and modules are not necessarily required by the present invention.

In the foregoing embodiments, the description of each of the embodiments has their respective focuses. For a part that is not described in detail in a certain embodiment, reference may be made to related description in other embodiments.

Figure 2:
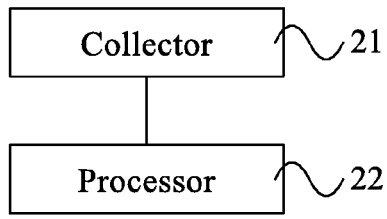
FIG. 2 is a schematic structural diagram of an image processing device according to another embodiment of the present invention.

FIG. 2 is a schematic structural diagram of an image processing device according to another embodiment of the present invention. As shown in FIG. 2, the image processing device in this embodiment may include a collector 21 and a processor 22. The collector 21 is configured to input a first image, where the first image is an RGB format image or a gray format image; and the processor 22 is configured to: convert, according to a preset image resolution, the first image or a gray format image converted from the first image into a second image corresponding to the preset image resolution, where the second image is a gray format image; obtain an atmospheric optical parameter according to the second image; convert, according to an image resolution of the first image, the second image into a third image corresponding to the image resolution of the first image; obtain an atmospheric transfer function according to the atmospheric optical parameter, the first image, and the third image, or according to the atmospheric optical parameter, the gray format image converted from the first image, and the third image; and obtain a fourth image according to the atmospheric optical parameter, the first image, and the atmospheric transfer function.

Optionally, in an optional implementation manner of this embodiment, the first image is an RGB format image. Before converting, according to the preset image resolution, the gray format image converted from the first image into the second image corresponding to the preset image resolution, the processor 22 may specifically convert the first image into a gray format image according to $$I_{gray} = \min_{c \in (R,G,B)} (I^c),$$

where, $I^c$ is a pixel component value of the first image, R is a red component of a pixel of the first image, G is a green component of a pixel of the first image, B is a blue component of a pixel of the first image, and $I_{gray}$ is a pixel value of the gray format image converted from the first image.

Optionally, in an optional implementation manner of this embodiment, the processor 22 may specifically divide the first image or the gray format image converted from the first image into M×N pixel blocks according to a preset image resolution M×N; select a minimum pixel value from pixel values of pixels in the pixel blocks; and use the selected minimum pixel value as a pixel value of a pixel of the second image.

Optionally, in an optional implementation manner of this embodiment, the first image is an RGB format image. Correspondingly, the processor 22 may specifically select a maximum pixel value from pixel values of pixels of the second image; determine a pixel block corresponding to the selected maximum pixel value; select a maximum sum of pixel component values from sums of pixel component values of pixels in the determined pixel block; determine a pixel corresponding to the selected maximum sum of pixel component values; and use a pixel component value of the determined pixel as the atmospheric optical parameter.

Optionally, in an optional implementation manner of this embodiment, the first image is a gray format image. Correspondingly, the processor 22 may specifically select a maximum pixel value from pixel values of pixels of the second image; and use the selected maximum pixel value as the atmospheric optical parameter.

Optionally, in an optional implementation manner of this embodiment, the processor 22 may specifically perform smooth filtering on the second image; and convert, according to the image resolution of the first image, the second image that has undergone the smooth filtering into a third image corresponding to the image resolution of the first image.

Optionally, in an optional implementation manner of this embodiment, the first image is a gray format image. Correspondingly, the processor 22 may specifically perform smooth filtering on the first image; and obtain the atmospheric transfer function according to the atmospheric optical parameter, the first image that has undergone the smooth filtering, and the third image.

For example, the processor 22 obtains the atmospheric transfer function according to $$t(x) = 1 - \frac{I(x)}{A} \times \frac{I'}{255},$$

where l(x) is a pixel value of the third image, I' is a pixel value of the first image or a pixel value of the first image that has undergone the smooth filtering, A is the atmospheric optical parameter, and t(x) is the atmospheric transfer function.

Optionally, in an optional implementation manner of this embodiment, the first image is an RGB format image. Correspondingly, the processor 22 may specifically perform smooth filtering on the gray format image converted from the first image; and obtain the atmospheric transfer function according to the atmospheric optical parameter, the gray format image that is converted from the first image and has undergone the smooth filtering, and the third image.

For example, the processor 22 obtains the atmospheric transfer function according to $$t(x) = 1 - \frac{I(x)}{A} \times \frac{I'}{255},$$

where l(x) is a pixel value of the third image, I' is a pixel value of the gray format image converted from the first image or a pixel value of the gray format image that is converted from the first image and has undergone the smooth filtering, A is the atmospheric optical parameter, and t(x) is the atmospheric transfer function.

Optionally, in an optional implementation manner of this embodiment, the collector 21 may specifically input a fourth image, where the fourth image is an image in a format other than the RGB format and the gray format; and use an RGB format image converted from the fourth image as the first image.

In this embodiment, the processor performs conversion processing on an image input by the collector, which effectively eliminates an impact on image quality from such weather conditions as fog, dust-haze, sand storm and rain where atmospheric transparency is low, and can solve a problem in the prior art that image quality of a captured image or video is poor due to a scattering function of suspended particles in the atmosphere under such weather conditions as fog, dust-haze, sand storm and rain where atmospheric transparency is low, thereby improving contrast, saturation, and sharpness of an image or a video (namely, a multi-frame image). The technical solutions according to the present invention are easy to be implemented and have a low cost.

It may be clearly understood by persons skilled in the art that, for the purpose of convenient and brief description, for a specific working process of the foregoing system, apparatus and unit, reference may be made to the corresponding process in the foregoing method embodiments, and details are not repeatedly described herein.

In the several embodiments provided in the present application, it should be understood that the disclosed system, apparatus, and method may be implemented in other manners. For example, the apparatus embodiment described in the foregoing is merely exemplary. For example, dividing of the units is merely a kind of logical function dividing and there may be other dividing manners in actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separated, and parts shown as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more than two units are integrated into one unit. The integrated unit may be implemented in the form of hardware, or may also be implemented in the form of hardware plus a software functional unit.

The integrated unit implemented in the form of software functional unit may be stored in a computer readable storage medium. The software functional unit is stored in a storage medium, and includes several instructions used to enable a computer device (which may be a personal computer, a server, or a network device, or the like) to perform a part of the steps of the methods according to the embodiments of the present invention. The foregoing storage medium includes: any medium that is capable of storing program codes, such as a U disk, a removable hard disk, a read-only memory (Read-Only Memory, ROM for short), a random access memory (Random Access Memory, RAM for short), a magnetic disk, or an optical disk.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to a part of the technical features of the technical solutions described in the foregoing embodiments; however, these modifications or replacements do not make the essence of the corresponding technical solutions depart from the spirit and scope of the technical solutions of the embodiments of the present invention.

What is claimed is:

1. An image processing method, comprising:
    inputting a first image, wherein the first image is an RGB format image or a gray format image;
    converting the first image or a gray format image converted from the first image into a second image corresponding to a preset image resolution, wherein the second image is a gray format image;
    obtaining an atmospheric optical parameter according to the second image;
    converting, according to an image resolution of the first image, the second image into a third image corresponding to the image resolution of the first image;
    obtaining an atmospheric transfer function according to the atmospheric optical parameter, the first image and the third image, or according to the atmospheric optical parameter, the gray format image converted from the first image and the third image; and
    obtaining a fourth image according to the atmospheric optical parameter, the first image, and the atmospheric transfer function.

2. The method according to claim 1, wherein the first image is an RGB format image and before converting the gray format image converted from the first image into the second image corresponding to the preset image resolution, the method further comprises:
    converting the first image into a gray format image according to $$I_{gray} = \min_{c \in (R,G,B)} (I^c),$$

wherein $I^c$ is a pixel component value of the first image, R is a red component of a pixel of the first image, G is a green component of a pixel of the first image, B is a blue component of a pixel of the first image, and $I_{gray}$ is a pixel value of the gray format image converted from the first image.

3. The method according to claim 1, wherein before converting to the first image or the gray format image converted from the first image into the second image, the method further comprises:
    dividing the first image or the gray format image converted from the first image into M×N pixel blocks according to a preset image resolution M×N;
    selecting a minimum pixel value from pixel values of pixels in the pixel blocks; and
    using the selected minimum pixel value as a pixel value of a pixel of the second image.

4. The method according to claim 1, wherein the first image is an RGB format image and wherein obtaining the atmospheric optical parameter according to the second image comprises:
    selecting a maximum pixel value from pixel values of pixels of the second image;

determining a pixel block corresponding to the selected maximum pixel value;

selecting a maximum sum of pixel component values from sums of pixel component values of pixels in the determined pixel block;

determining a pixel corresponding to the selected maximum sum of pixel component values; and using a pixel component value of the determined pixel as the atmospheric optical parameter.

5. The method according to claim 1, wherein the first image is a gray format image and wherein obtaining the atmospheric optical parameter according to the second image comprises:

selecting a maximum pixel value from pixel values of pixels of the second image; and using the selected maximum pixel value as the atmospheric optical parameter.

6. The method according to claim 1, wherein converting the second image into the third image corresponding to the image resolution of the first image comprises:

performing smooth filtering on the second image; and converting, according to the image resolution of the first image, the second image that has undergone the smooth filtering into the third image.

7. The method according to claim 1, wherein the first image is a gray format image and obtaining the atmospheric transfer function according to the atmospheric optical parameter, the first image, and the third image comprises:

performing smooth filtering on the first image; and obtaining the atmospheric transfer function according to the atmospheric optical parameter, the first image that has undergone the smooth filtering, and the third image;

or wherein the first image is an RGB format image and obtaining the atmospheric transfer function according to the atmospheric optical parameter, the gray format image converted from the first image, and the third image comprises:

performing smooth filtering on the gray format image converted from the first image; and obtaining the atmospheric transfer function according to the atmospheric optical parameter, the gray format image that is converted from the first image and has undergone the smooth filtering, and the third image.

8. The method according to claim 1, wherein obtaining the atmospheric transfer function according to the atmospheric optical parameter, the first image, and the third image comprises:

obtaining the atmospheric transfer function according to $$t(x) = 1 - \frac{I(x)}{A} \times \frac{I'}{255},$$

wherein l(x) is a pixel value of the third image, I' is a pixel value of the first image or a pixel value of the first image that has undergone smooth filtering, or is a pixel value of the gray format image converted from the first image or a pixel value of the gray format image that is converted from the first image and has undergone smooth filtering, A is the atmospheric optical parameter, and t(x) is the atmospheric transfer function.

9. The method according to claim 1, wherein inputting the first image comprises:

inputting a fifth image, wherein the fifth image is an image in a format other than the RGB format and the gray format; and using an RGB format image converted from the fifth image as the first image.

10. An image processing device, comprising:

a collector, configured to input a first image, wherein the first image is an RGB format image or a gray format image; and a processor, configured to convert, according to a preset image resolution, the first image or a gray format image converted from the first image into a second image corresponding to the preset image resolution, wherein the second image is a gray format image; to obtain an atmospheric optical parameter according to the second image; to convert, the second image into a third image corresponding to the image resolution of the first image; according to an image resolution of the first image, to obtain an atmospheric transfer function according to the atmospheric optical parameter, the first image, and the third image, or according to the atmospheric optical parameter, the gray format image converted from the first image, and the third image; and to obtain a fourth image according to the atmospheric optical parameter, the first image, and the atmospheric transfer function.

11. The device according to claim 10, wherein the first image is an RGB format image and, before converting the gray format image converted from the first image into the second image corresponding to the preset image resolution, the processor is further configured to:

convert the first image into a gray format image according to $$I_{gray} = \min_{c \in (R,G,B)} (I^c),$$

wherein $I^c$ is a pixel component value of the first image, R is a red component of a pixel of the first image, G is a green component of a pixel of the first image, B is a blue component of a pixel of the first image, and $I_{gray}$ is a pixel value of the gray format image converted from the first image.

12. The device according to claim 10, wherein the processor is configured to divide the first image or the gray format image converted from the first image into M×N pixel blocks according to a preset image resolution M×N; to select a minimum pixel value from pixel values of pixels in the pixel blocks; and to use the selected minimum pixel value as a pixel value of a pixel of the second image.

13. The device according to claim 10, wherein the first image is an RGB format image and wherein the processor is specifically configured to select a maximum pixel value from pixel values of pixels of the second image to determine a pixel block corresponding to the selected maximum pixel value to select a maximum sum of pixel component values from sums of pixel component values of pixels in the determined pixel block, to determine a pixel corresponding to the selected maximum sum of pixel component values and to use a pixel component value of the determined pixel as the atmospheric optical parameter.

14. The device according to claim 10, wherein the first image is a gray format image and wherein the processor is configured to select a maximum pixel value from pixel values of pixels of the second image and to use the selected maximum pixel value as the atmospheric optical parameter.

15. The device according to claim 10, wherein the processor is configured to perform smooth filtering on the second image and to convert, according to the image resolution of the first image, the second image that has undergone the smooth filtering into a third image corresponding to the image resolution of the first image.

16. The device according to claim 10, wherein:
the first image is a gray format image and the processor is specifically configured to perform smooth filtering on the first image and to obtain the atmospheric transfer function according to the atmospheric optical parameter, the first image that has undergone the smooth filtering, and the third image; or
the first image is an RGB format image and the processor is specifically configured to perform smooth filtering on the gray format image converted from the first image, and to obtain the atmospheric transfer function according to the atmospheric optical parameter, the gray format image that is converted from the first image and has undergone the smooth filtering, and the third image.

17. The device according to claim 10, wherein the processor is configured to:
obtain the atmospheric transfer function according to $$t(x) = 1 - \frac{I(x)}{A} \times \frac{I'}{255},$$

wherein l(x) is a pixel value of the third image, I' is a pixel value of the first image or a pixel value of the first image that has undergone smooth filtering, or is a pixel value of the gray format image converted from the first image or a pixel value of the gray format image that is converted from the first image and has undergone smooth filtering, A is the atmospheric optical parameter, and t(x) is the atmospheric transfer function.

18. The device according to claim 10, wherein the collector is specifically configured to input a fifth image, wherein the fifth image is an image in a format other than the RGB format and the gray format, and to use an RGB format image converted from the fifth image as the first image.

19. The device according to claim 11, wherein the processor is specifically configured to divide the first image or the gray format image converted from the first image into M×N pixel blocks according to a preset image resolution M×N, to select a minimum pixel value from pixel values of pixels in the pixel blocks, and to use the selected minimum pixel value as a pixel value of a pixel of the second image.

20. The device according to claim 11, wherein the first image is an RGB format image, and the processor is configured to select a maximum pixel value from pixel values of pixels of the second image, to determine a pixel block corresponding to the selected maximum pixel value, to select a maximum sum of pixel component values from sums of pixel component values of pixels in the determined pixel block, to determine a pixel corresponding to the selected maximum sum of pixel component values, and to use a pixel component value of the determined pixel as the atmospheric optical parameter.

* * * * *